(No Model.) 2 Sheets—Sheet 1.
A. M. G. SÉBILLOT.
APPARATUS FOR TREATING MINERALS OR OTHER SUBSTANCES WITH ACIDS.
No. 248,800. Patented Oct. 25, 1881.
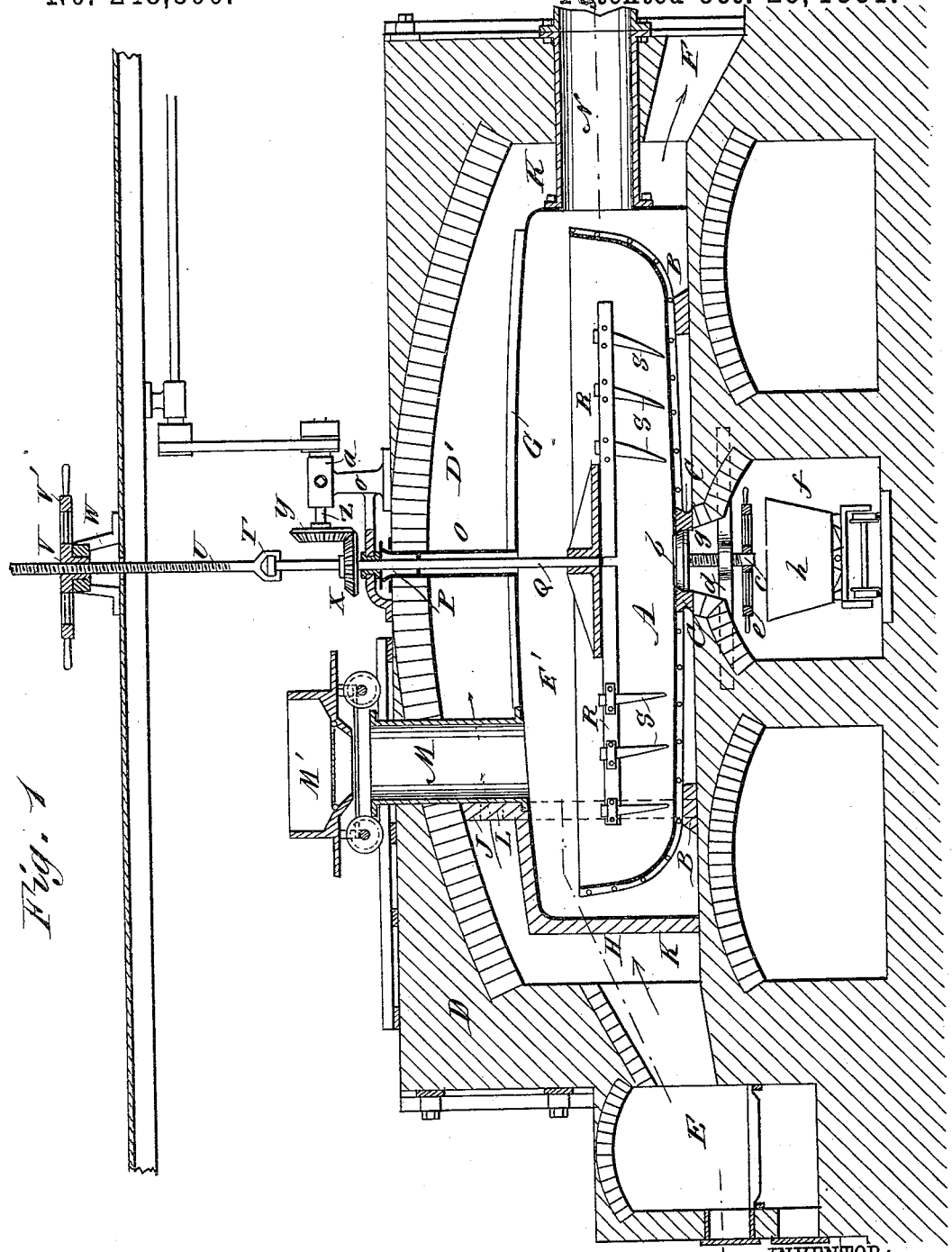
WITNESSES:
INVENTOR:
A. M. G. Sébillot
BY Munn & Co
ATTORNEYS.

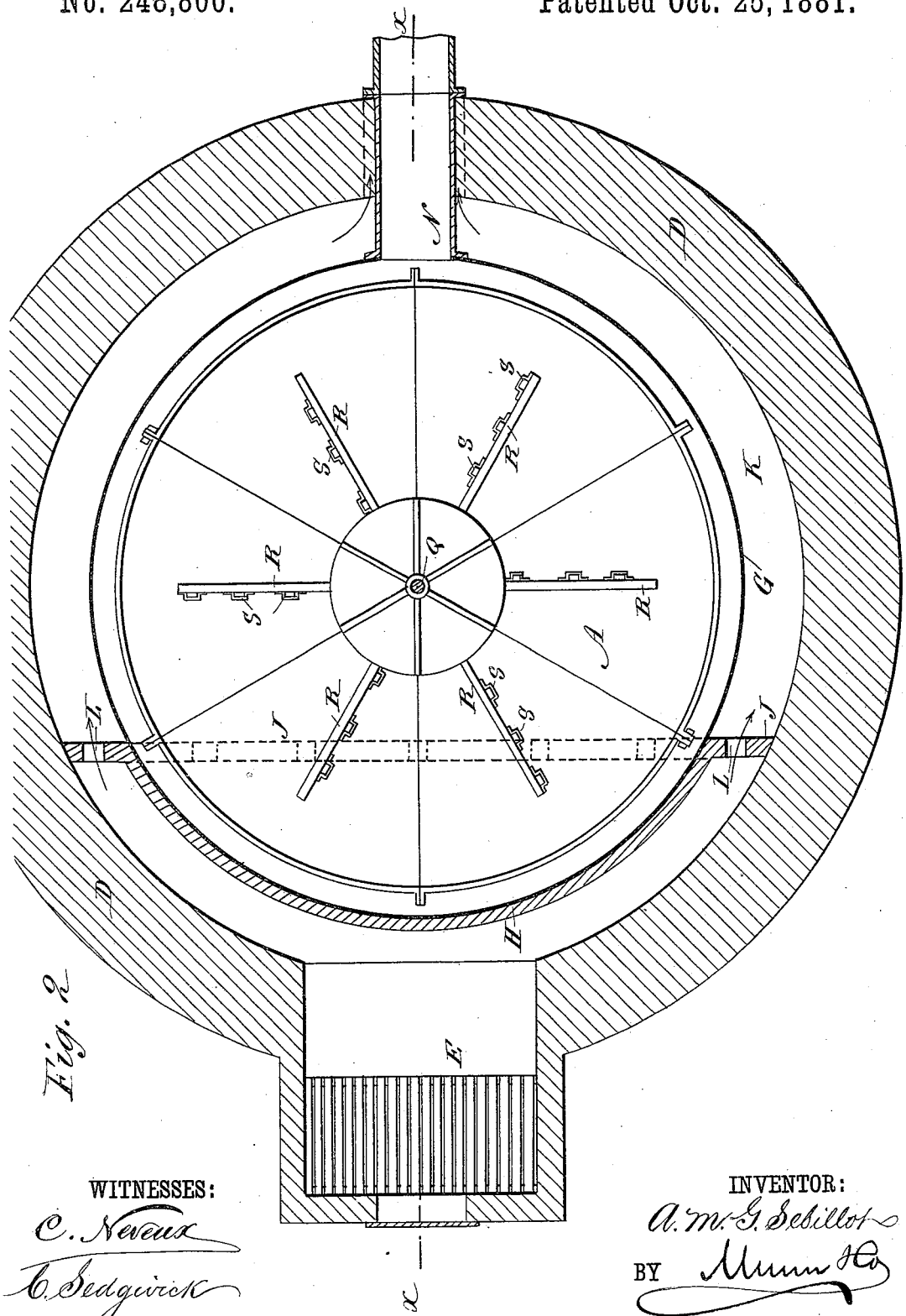

UNITED STATES PATENT OFFICE.

AMÉDÉE M. G. SÉBILLOT, OF DENVER, COLORADO.

APPARATUS FOR TREATING MINERALS OR OTHER SUBSTANCES WITH ACIDS.

SPECIFICATION forming part of Letters Patent No. 248,800, dated October 25, 1881.

Application filed February 18, 1881. (No model.)

*To all whom it may concern:*

Be it known that I, AMÉDÉE M. G. SÉBILLOT, of Denver, in the county of Arapahoe and State of Colorado, have invented a new and Improved Apparatus for Treating Minerals or other Substances with Acids, of which the following is a specification.

The object of my invention is to facilitate the treatment of large quantities of minerals or chemicals with acid without requiring a repeated handling of the materials.

The invention consists in a basin for receiving the material to be treated with acid, which basin is surrounded and covered by a metal hood which is covered by a large stone or brick work furnace having a fire-place on one side, so that the heat passes over the hood and heats the same and the materials in the basin below it, which materials are stirred during the operation by a rotating agitator, which is mounted on the lower end of a vertical shaft that can be raised or lowered at will, and is driven by suitable machinery. The materials are filled into the basin through a funnel or chute passing through the hood and the furnace, and the product of the operation is removed from the basin through a valve in the center of the same, which valve is operated from below, permitting the material to drop into a suitable car which runs on tracks in a tunnel or passage-way, passing through the base of the furnace below the cupola.

In the accompanying drawings, Figure 1 is a longitudinal sectional elevation of my improved converter on the line $x\ x$, Fig. 2. Fig. 2 is a horizontal sectional view of the same on the line $y\ y$, Fig. 1.

The iron basin A, having the shape of a flat cup or of a saucer, may be cast in one piece or composed of several castings bolted together, and is provided on its inner side with a lining of fire-clay or of tiles. The basin rests upon suitable supports, B B and C C, on the bottom of a reverberatory-furnace fire-chamber, D', provided with a fire-place, E, at one end, and the exhaust-flue F, leading to a chimney or a boiler, at the other end. An iron hood, G, which is slightly larger and higher than the basin, covers the same, also resting upon the floor of the reverberating furnace D, and forms a converting-chamber, E'. The front of this hood is protected by a wall, H, of fire-brick, and a wall, J, of fire-brick, passes over the top of the hood G, near the front of the same, and this wall also crosses the annular passage K between the hood and the inner wall of the furnace, and thus divides the furnace into two parts. This wall J is provided with numerous apertures, L, which allow the heat to pass from the front to the rear part of the furnace. This wall is provided for the protection of the top of the hood G from the direct action of the flames, to prevent a rapid destruction of this hood.

A funnel or chute, M, extends from the top of the furnace down to the hood G, for the purpose of filling the basin A. The material is transported in a car, M', provided with a removable bottom, which is removed when the car is directly over the chute M. The chute is ordinarily closed by means of a suitable lid. A pipe, N, passes from the side of the hood G, through the side of the furnace, and serves to conduct the vapors of the acid into suitable condensers. A tube, O, extends upward from the top of the hood G to the top of the furnace, and a stuffing-box, P, is formed at the upper end of this tube, in order to prevent the escape of vapor through the space between the tube and the shaft Q, passing longitudinally through this tube. A series of radial arms, R R, provided with a number of teeth, S S, are attached to the lower end of this shaft, the teeth S S being arranged in such a manner that each one describes a different circle—that is, the corresponding teeth on the several arms are not located the same distance from the shaft Q. The upper end of the shaft Q is supported by the swivel T at the lower end of a screw-rod, U, which passes through a nut, V, forming the hub of a large wheel, V', resting horizontally upon a support, W. A bevel cog-wheel, X, is mounted on the shaft Q in such a manner that this shaft can slide through this wheel, but will rotate with the wheel. This wheel engages with a like wheel, Y, mounted on a horizontal shaft, Z, provided with a pulley for a driving-belt. The inner supports, C, of the basin A form a seat for a valve, $b$, in the middle of the basin, which valve opens downward, and has a screw, $c$, attached to its under side. This screw passes through a threaded aperture in a beam, d, and a hand-wheel, e, is fastened to the lower end of the screw. A tunnel, f, passes transversely through the base of the furnace, below the basin A, and a funnel, g, is formed in the top of this tunnel, to permit the material that passes from the bottom of the basin to drop into a car, h, running on rails in this tunnel.

The operation is as follows: While the material drops through the chute M into the basin A the agitator-arms R R are slowly revolving, thus distributing the material equally throughout the entire basin. It is necessary to raise the agitator more or less, according to quantity of material in the basin, and to accomplish this the wheel V is turned, causing the screw-rod U, from which the agitator is suspended, to rise or descend. The agitator rotates continually during the entire operation, so as to thoroughly mix the crushed or powdered material and the acid. The heat strikes the sides and top of the hood G and heats the air in the hood, and this, in turn, heats the materials in the basin, which are converted into sulphates, muriates, nitrates, phosphates, &c., as the case may be. After the operation is completed the valve b is opened by turning the wheel e, and the material drops into the car h, and is transported to other parts of the factory for further operations.

Large quantities of chemicals or minerals can thus be treated with acid in a very simple and convenient manner, and the materials need only be shoveled into the car m', which can be drawn up an inclined plane to the top of furnace, and consequently but very few laborers are required in proportion to the quantity of material treated.

Having thus described my invention, what I claim as new, and desire to secure by Letters Patent, is—

1. The combination, with a reverberatory furnace, of the chute M, hood G, basin A, and a rotary agitator, as and for the purpose specified.

2. The combination, with the arms R, having teeth S, of the shaft Q, the swivel T, the screw-rod U, the nut V, and a device for rotating the shaft Q, substantially as and for the purpose specified.

3. The combination, with the basin A, of the agitator-arms R R, the shaft Q, the hood G, the tube O, and of the stuffing-box P, substantially as herein shown and described, and for the purpose set forth.

AMÉDÉE M. G. SÉBILLOT.

Witnesses:
 OSCAR F. GUNZ,
 C. SEDGWICK.